United States Patent
Jackson

(10) Patent No.: US 11,383,489 B2
(45) Date of Patent: Jul. 12, 2022

(54) PACKAGE COMPRISING A SEALED CONTACT AREA INCLUDING A NONWOVEN HAVING A BONDED SURFACE WITH AN EMBOSSED IMPRESSION PATTERN

(71) Applicant: DUPONT SAFETY & CONSTRUCTION, INC., Wilmington, DE (US)

(72) Inventor: Richard Alan Jackson, Glen Allen, VA (US)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 0 days.

(21) Appl. No.: 15/706,817

(22) Filed: Sep. 18, 2017

(65) Prior Publication Data

US 2018/0099483 A1    Apr. 12, 2018

Related U.S. Application Data

(60) Provisional application No. 62/406,547, filed on Oct. 11, 2016.

(51) Int. Cl.
*B32B 9/04* (2006.01)
*B32B 27/36* (2006.01)
(Continued)

(52) U.S. Cl.
CPC ............ *B32B 9/047* (2013.01); *B32B 3/30* (2013.01); *B32B 5/022* (2013.01); *B32B 7/06* (2013.01);
(Continued)

(58) Field of Classification Search
USPC ....... 264/310, 284; 604/408; 428/36.6, 36.4, 428/35.2, 230, 35.7; 206/438, 484.3, 532,
(Continued)

(56) References Cited

U.S. PATENT DOCUMENTS 3,081,519 A    3/1963    Blades et al.
3,227,794 A    1/1966    Anderson et al.
(Continued)

FOREIGN PATENT DOCUMENTS

JP    2000510198 A    8/2000
JP    2017522210 A    8/2017
(Continued)

OTHER PUBLICATIONS

International Search Report, dated Nov. 29, 2017, for International Application No. PCT/US2017/051323, International Filing Date Sep. 13, 2017; ISA/European Patent Office; Authorized Officer, Jena-Francois Maxet.

*Primary Examiner* — Lynda Salvatore

(57) ABSTRACT

This invention relates to a package for providing an enclosed interior environment capable of being sterilized and a gas permeable fibrous nonwoven sheet structure useful in such structure, wherein the nonwoven sheet structure has at least one surface having a pre-sealed, embossed impression pattern; and a particle barrier penetration of below 10%, a Gurley Hill Porosity of 40 seconds or less, and a moisture vapor transport rate of 3500 g/m²/day or greater.

9 Claims, 3 Drawing Sheets

(51) Int. Cl.
*B32B 27/12* (2006.01)
*B32B 27/32* (2006.01)
*B32B 7/06* (2019.01)
*B32B 27/08* (2006.01)
*B32B 7/12* (2006.01)
*B32B 27/34* (2006.01)
*B32B 27/30* (2006.01)
*B32B 5/02* (2006.01)
*B32B 3/30* (2006.01)
*D21H 27/02* (2006.01)

(52) U.S. Cl.
CPC ............... *B32B 7/12* (2013.01); *B32B 27/08* (2013.01); *B32B 27/12* (2013.01); *B32B 27/306* (2013.01); *B32B 27/32* (2013.01); *B32B 27/34* (2013.01); *B32B 27/36* (2013.01); *D21H 27/02* (2013.01); *B32B 2262/0253* (2013.01); *B32B 2305/02* (2013.01); *B32B 2307/724* (2013.01); *B32B 2307/75* (2013.01); *B32B 2323/04* (2013.01); *B32B 2439/40* (2013.01); *B32B 2439/46* (2013.01); *B32B 2439/80* (2013.01)

(58) Field of Classification Search
USPC ......... 206/277, 439, 363, 204; 383/102, 103
See application file for complete search history.

(56) References Cited

U.S. PATENT DOCUMENTS

| | | |
|---|---|---|
| 3,532,589 A | 10/1970 | David |
| 3,860,369 A | 1/1975 | Brethauer et al. |
| 5,972,147 A | 10/1999 | Janis |
| 6,010,970 A | 1/2000 | McGinty et al. |
| 6,034,008 A | 3/2000 | Lim et al. |
| 7,338,916 B2 | 3/2008 | Rollin |
| 8,048,513 B2 | 11/2011 | Marin et al. |
| 2002/0004351 A1 | 1/2002 | Nobbee et al. |
| 2010/0228214 A1* | 9/2010 | Bornemann ............ D04H 3/005 604/372 |
| 2011/0127188 A1* | 6/2011 | Thompson ............... B32B 27/08 206/438 |
| 2012/0227362 A1* | 9/2012 | Lima ......................... B32B 5/26 53/461 |
| 2016/0016385 A1 | 1/2016 | DuPont |

FOREIGN PATENT DOCUMENTS

| | | |
|---|---|---|
| WO | 9740224 A1 | 10/1997 |
| WO | 9740224 A1 | 10/1997 |

* cited by examiner

PACKAGE COMPRISING A SEALED CONTACT AREA INCLUDING A NONWOVEN HAVING A BONDED SURFACE WITH AN EMBOSSED IMPRESSION PATTERN

BACKGROUND OF THE INVENTION

Field of the Invention

This invention relates to improved packages for providing an enclosed interior environment capable of being sterilized, and gas-permeable fibrous nonwoven sheet structures suitable for use therein.

Description of Related Art

U.S. Pat. No. 6,034,008 to Lim et al. discloses a sheet material suitable for use in filtration and sterile packaging that has strength, weight and barrier properties at least equivalent to that of the TYVEK® spunbonded olefin nonwoven sheet material that has been traditionally used for such applications, but that also has significantly improved air and liquid permeability.

In particular, Lim et al. discloses a whole surface bonded "hard structure" product that has the feel of slick paper that is used commonly in a number of applications, including sterile packaging; and a point bonded and softened "soft structure" product with a more fabric-like feel for apparel applications.

As Lim et al. discloses, it is thought that the full surface bonding of a "hard structure" flash-spun sheet product causes the high surface area plexifilamentary fibers of the sheet to shrink, which in turn causes the pores between the fibers to open up. Accordingly, "hard structure" sheet products generally have higher moisture vapor transmission rates and higher hydrostatic head values as compared to "soft structure" sheet products. This more permeable material has been found to have great utility in sterile packaging materials where increased permeability permits the materials to perform their function in a more efficient manner.

Fibrous nonwoven sheets are useful in packages that can be sterilized because they allow manufacturers to first package items and then sterilize the items in the packages, using gases such as steam, ethylene oxide, or some combination thereof. The sterilizing gas is able to penetrate the package through the fibrous nonwoven sheets to sterilize the enclosed interior of the package. Suitable fibrous nonwoven sheets also provide a barrier to contaminants to prevent the sterilized packaged items from being contaminated prior to the package being opened.

It is not unusual for the sterilized packages to be opened in a sterilized environment, and one desirable feature of the fibrous nonwoven sheet is that it be peelable from the package without excessive tear of the nonwoven sheet surface when the sheet is removed. It is believed by some that the rupture of the surface of the nonwoven sheet during peeling, the fiber tear, could possibly contaminate the sterilized environment in which the package is opened.

Since most sterilized packages are used in health-related settings like operating rooms, any improvement that helps prevent or reduces any possible contamination is desirable. In packaging, in particular any improvement in the peel performance of the fibrous nonwoven structure is greatly desired.

BRIEF SUMMARY OF THE INVENTION

This invention relates to a package for providing an enclosed interior environment capable of being sterilized, the package comprising a gas permeable fibrous nonwoven sheet structure, polymeric tie layer, and package substrate; the nonwoven sheet structure having a first surface and a second surface; the enclosed interior environment being formed by sealing an area of contact between the first surface of the nonwoven sheet structure and the package structure, the sealed area of contact being formed by the polymeric tie layer; wherein the first surface of the nonwoven sheet structure is pre-bonded with an embossed impression pattern at least within the sealed area of contact.

This invention also relates to a fibrous nonwoven sheet structure suitable for use in sterile packaging, the sheet structure being gas permeable and having a first surface and a second surface; the first surface being bonded with an embossed impression pattern and the second surface being capable of accepting printing; the sheet structure having a particle barrier penetration of below 10%, a Gurley Hill Porosity of 40 seconds or less, and a moisture vapor transport rate of 3500 $g/m^2/day$ or greater.

DETAILED DESCRIPTION OF THE INVENTION

Figure 1:
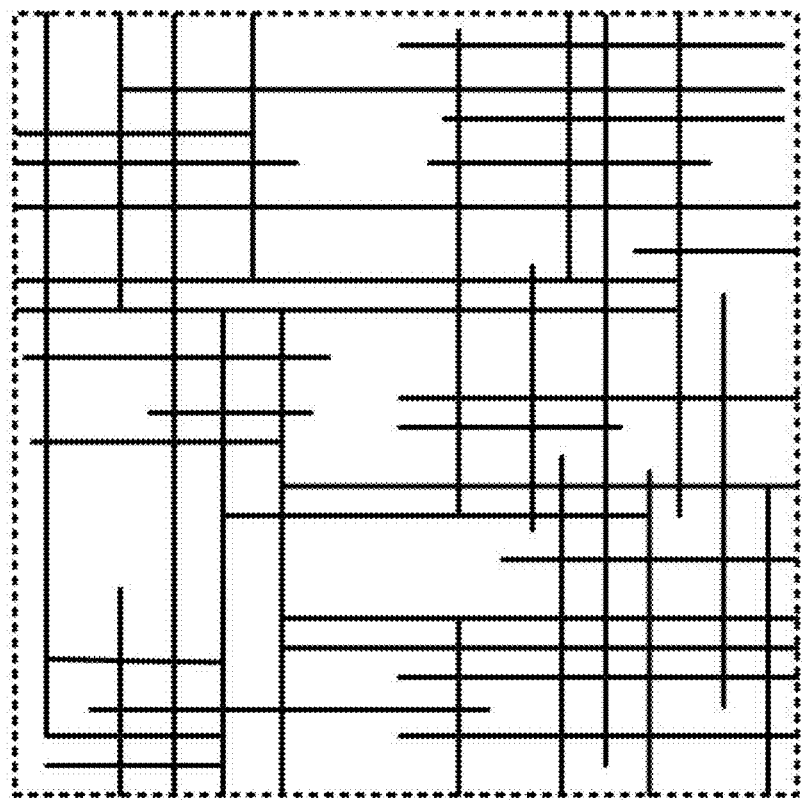
FIGS. 1 and 2 are illustrations of some embossed impression patterns.

This invention relates to a package for providing an enclosed interior environment capable of being sterilized and a gas permeable fibrous nonwoven sheet structure useful in such structure, wherein the nonwoven sheet structure has at least one surface being prebonded with an embossed impression pattern and having a particle barrier penetration of below 10%, a Gurley Hill Porosity of 40 seconds or less, and a moisture vapor transport rate of 3500 $g/m^2/day$ or greater.

Surprisingly, it has been found that a nonwoven sheet structure having a bonded surface with an embossed impression pattern can be used in a sealed package having an interior environment capable of being sterilized. It is surprising in that (1) an embossed nonwoven surface can provide a good seal to the package structure, and also (2) the resulting package has a superior level of peel performance when the package is opened, better in many instances than smooth surface bonded sheets.

It is desirable that any package utilized and opened in a sterile environment have a "clean peel" or provide an "aseptic peel/presentation", terms used by the medical industry to refer to the requirement that the package can be opened and the contents presented to the sterile environment without risk of contamination. As used herein, this superior opening performance is determined by the use of a "fiber tear" criterion. Surprisingly, the use of a nonwoven sheet structure having at least one surface being prebonded with an embossed impression pattern, in contact with a polymeric tie layer, can provide packages that have a clean peel and have very low fiber tear, or are actually fiber tear free.

Even more remarkable is that this superior level of peel performance is achieved without any additional coating layers on the fibrous nonwoven sheet structure. The use of nonwoven coatings can provide an improved peel, but the simple use of such coatings can generate other loose particles that risk the aseptic presentation.

The package for providing an enclosed interior environment capable of being sterilized comprises a gas permeable fibrous nonwoven sheet structure, polymeric tie layer, and package substrate.

The packaging substrate can be any material that forms a flexible or semi-rigid package, such as packaging in the form of a sachet, a bag, a sheath, or a blister pack. The package including the packaging substrate generally serves to protect the package item and in the case of sterile packaging helps maintain the packaged item in a non-contaminated state until ready for use. In one practical application, the item to be packaged is put into the packaging substrate, and then it is sealed, using a polymeric tie layer and a gas permeable fibrous nonwoven sheet structure to form the enclosed environment. Then if desired the package with the enclosed item can be sterilized using a suitable sterilizing gas. In some embodiments the packaging substrate comprises polyamides (especially nylons), polypropylene, polyesters (especially polyethylene terephthalate) and any combination thereof.

Figure 3:
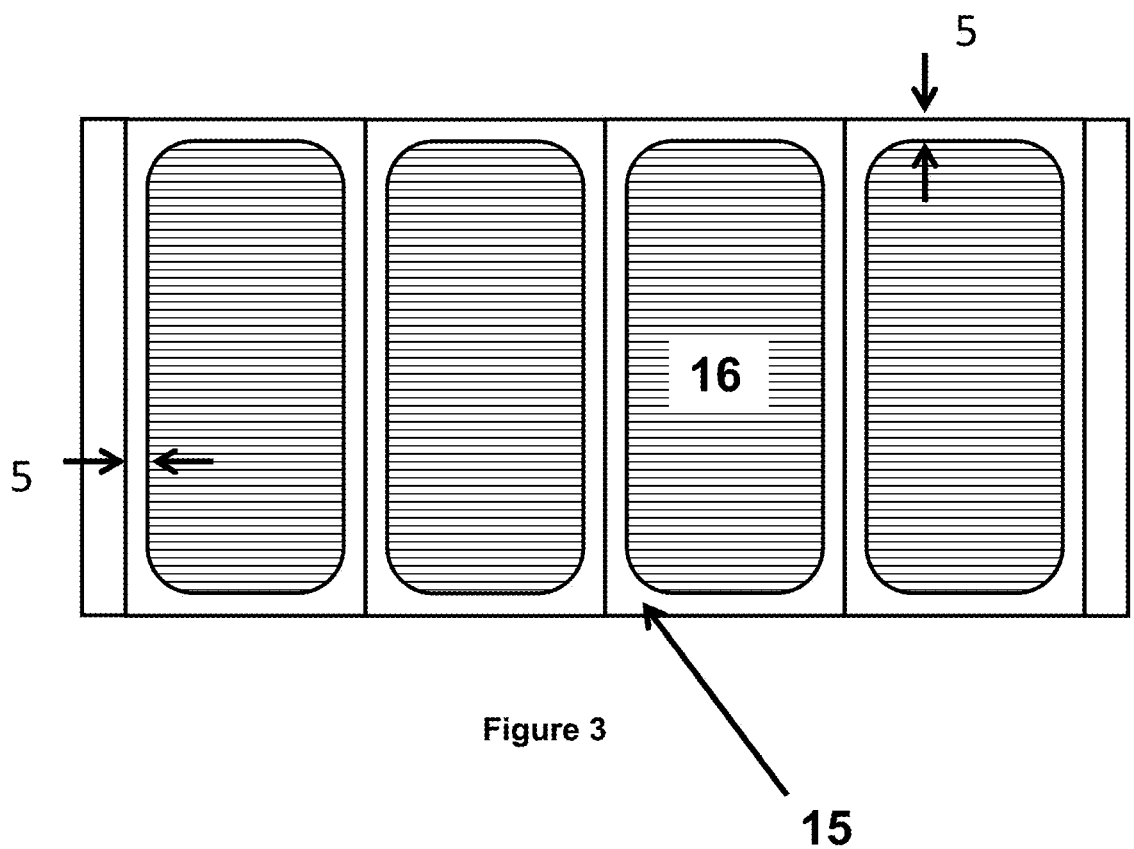
FIGS. 3 and 4 are illustrations of some packaging substrates showing the area of sealing.
Figure 4:
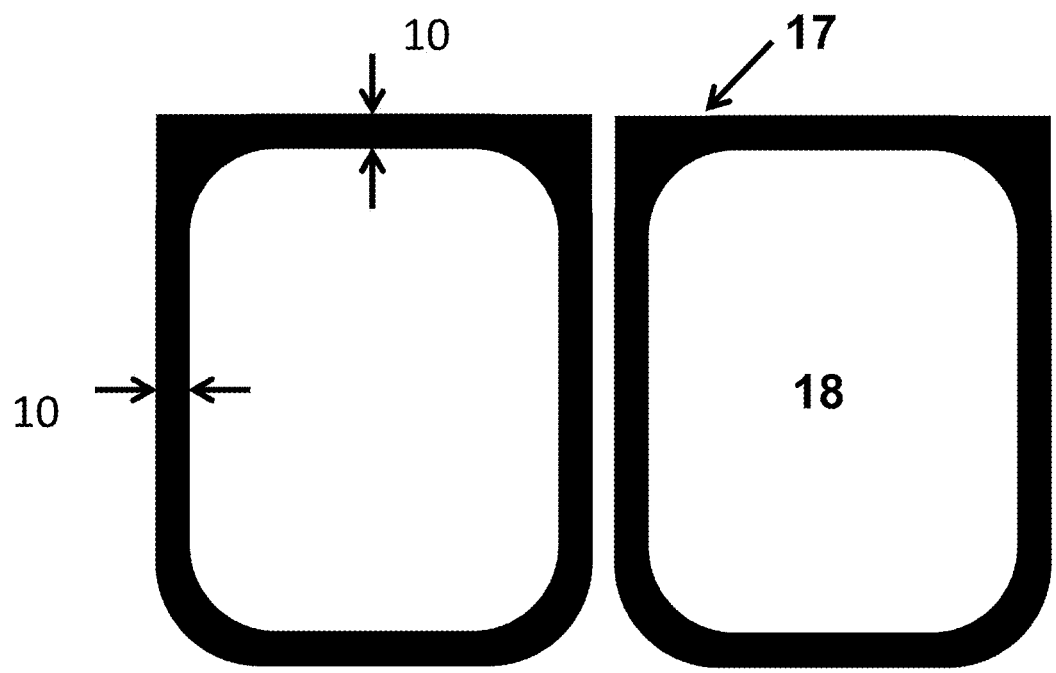

The package includes a polymeric tie layer to seal an area of contact between the nonwoven sheet structure and the package structure. The polymeric tie layer is preferably any flexible or semi-rigid film that is compatible with both the packaging substrate and the nonwoven sheet structure and will suitably seal the nonwoven sheet structure to the packaging substrate. By compatible with, it is meant the polymeric tie layer does not adversely react with either the nonwoven sheet or the packaging substrate and has a suitable shelf life, maintaining a package sealed until its intended use. In some preferred embodiments, the polymeric tie layer is integral with the packaging substrate. As shown in FIGS. 3 and 4, the seal areas 15 and 17 illustrate one embodiment of the area where the polymeric tie layer forms a sealed area of contact, where the package substrate the fibrous nonwoven sheet structure would contact The polymeric tie layer is preferably in the form of a film. The composition of the polymeric tie layer can comprise compositions including such things as, for example, polyethylene, including low-density polyethylene, ethylene vinyl acetate, and any combination thereof.

In some preferred embodiments, the polymeric tie layer and package substrate are integral. In some embodiments they are combined in the same film. In this case, as used herein, the packaging substrate is defined as a "structural material" and that structural material is integrally combined with a polymer useful as a polymeric tie layer in the film. For example, some useful structural materials include polyamides (especially nylons), polypropylene, polyesters (especially polyethylene terephthalate) and any combination thereof. Especially desired structural material/polymeric tie layer combinations that can be used when the package substrate and polymeric tie layer are integral include polyimide/polyethylene, polyester/polyethylene, polypropylene/polyethylene, polypropylene/ethylene vinyl acetate, polyimide-polypropylene/polyethylene, and the like.

The fibrous nonwoven sheet structure is gas permeable, meaning that sterilizing gases such as ethylene oxide and/or steam can pass through the sheet without the use of excessive pressure. In particular the fibrous nonwoven sheet structure has a Gurley Porosity (also known as Gurley-Hill porosity) of 40 seconds or less. This property is a measure of how long it takes a volume of gas to pass through an area of material wherein a certain pressure gradient exists; therefore, lower numbers mean the material is more gas permeable, and higher numbers mean the material is less permeable. In some embodiments, the fibrous nonwoven sheet structure has a Gurley Porosity of 10 seconds or less. In some embodiments, the fibrous nonwoven sheet structure has a Gurley Porosity of 5 seconds or less, and some most preferred embodiments the fibrous nonwoven sheet structure has a Gurley Porosity of 3 seconds or less.

Another indicator of permeability is the measured value of moisture vapor transport, with higher values being more permeable. This is particularly important when steam is used as part of the sterilizing process. The fibrous nonwoven sheet structure has a moisture vapor transport rate of at least 3500 $g/m^2$/day or greater. In some preferred embodiments, the fibrous nonwoven sheet structure has a moisture vapor transport rate of at least 7500 $g/m^2$/day or greater. In some other embodiments, the fibrous nonwoven sheet structure has a moisture vapor transport rate of at least 9000 $g/m^2$/day or greater. Preferably the fibrous nonwoven sheet structure is uncoated, allowing for a more permeable sheet structure. The use of coatings for improved adhesion tend to close the surface of the nonwoven sheet structure, reducing the rate at which the sterilizing gas can pass through the structure.

The fibrous nonwoven sheet structure has a first surface and a second surface with the first surface being bonded with an embossed impression pattern. As used herein the phrase "being bonded with an embossed impression pattern" means the surface has at least two characteristics, the first being the fibrous material on the surface has been "bonded", meaning that the fibrous material has been substantially consolidated and stabilized by from the heat and pressure provided to the sheet from heated sources such as rolls; and that, additionally, the surface has an embossed impression pattern that leaves the surface with a visual texture. As used herein, the use of the words "is pre-bonded" is meant the fibrous nonwoven sheet structure is embossed prior to being incorporated into any package.

In one embodiment, the embossed impression pattern in the sheet is provided by calendering the nonwoven sheet in the nip between a heated metal roll and elastomeric backup roll, the metal roll being provided with a pattern of raised areas or bosses extending radially outward from the surface of the roll. In some preferred embodiments, the raised areas or bosses extend 0.008 to 0.020 inches (0.20 to 0.50 mm) from the surface of the remainder of the roll. In some other embodiments, the raised areas or bosses can have a width of 0.005 to 0.025 inches (0.12 to 0.64 mm). In some preferred embodiments, the width of the raised areas or bosses can be 0.005 to 0.015 inches (0.12 to 0.38 mm).

Figure 2:
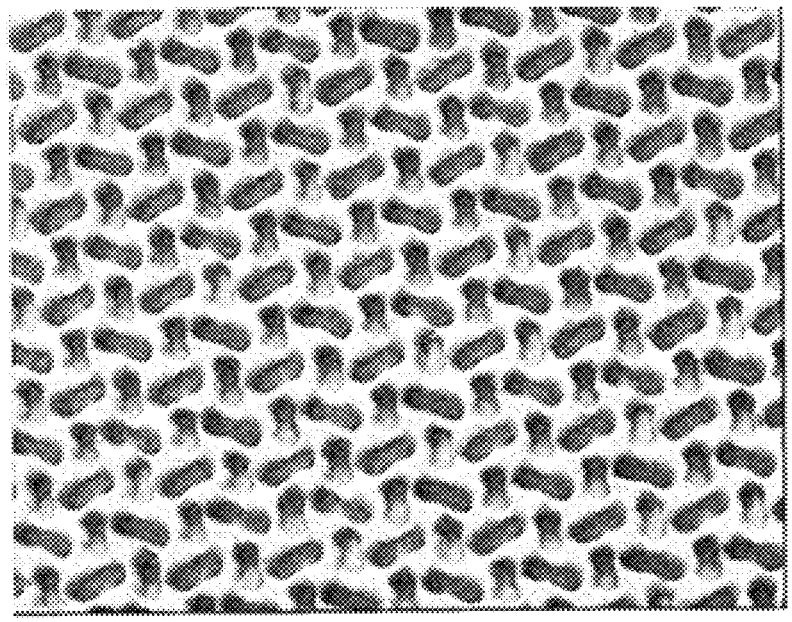

When the fibrous nonwoven sheet is pressed in the nip between the heated metal roll having the raised areas or bosses and the elastomeric backup roll, the nonwoven sheet is left with an embossed impression pattern having a depth essentially equivalent to the dimensions of the bosses. FIGS. 1 and 2 provide illustrations of two potentially useful and desired embossed impression patterns, with FIG. 1 referred to as a linen pattern and FIG. 2 referred to as a dogbone pattern.

One preferred method of embossing the nonwoven sheet is thermally bonding the sheet on a modified machine similar to that described in FIG. 2 of U.S. Pat. No. 5,972,147 to Janis. In the pre-heating section of that modified machine, each of the sides of the nonwoven being bonded are put in contact with a plurality of preheat rolls. In some preferred embodiments for the embossed nonwoven sheet described herein, the Janis machine is modified such that there are four heating rolls in this section, operating at temperatures sufficient to essentially provide generous surface bonding of the sheet. The temperatures will depend on the melting point of the material being bonded. After the preheat rolls, the sheet passes through preferably only one of the multiple embosser stations shown to apply an embosser pattern to preferably only one surface of the sheet. On each embosser station there is an embosser roll that can be pressed onto a back-up roll to form a nip. The pressure between the embosser and back-up roll is expressed in pounds per linear inch (pli). The back-up roll is typically covered with an elastomeric covering and is internally cooled by a re-circulation cooling media. The nonwoven sheet is subsequently transferred to a plurality of cooling rolls where the temperature of the sheet material is reduced, and then wound up into a roll.

The use of multiple preheating rolls operating at high temperatures not only helps bond the first surface of the nonwoven to be embossed, but also provides an opposite second surface that is also a bonded. This second surface is preferably capable of accepting printing. Further is it preferred that the second surface have a smooth surface free of any embossing for the best printing performance. Many packages require very specific bar codes and other delicate and small indicia, which requires a very uniform and flat surface free of the texture provided by embossing.

Alternatively, the sheet can be first surface bonded, wound up on a roll, and then subsequently unwound and embossed on one side to provide the first surface being bonded with an embossed impression pattern. Other embossing processes are possible, as long as they provide the fibrous nonwoven sheet having at least a first surface that is bonded with an embossed impression pattern. Preferably the process provides a second surface being capable of accepting printing. Preferably the second surface is uniform and free of any embossed pattern.

In some embodiments, the fibrous nonwoven sheet structure has good barrier to contaminates and has adequate durability to withstand general handling without damage or contamination to the packaged contents. Therefore, the fibrous nonwoven sheet structure having an embossed impression pattern preferably has a particle barrier penetration of below 10%, as determined with a TSI 8130 equipment. It is believed that his particle barrier test is useful in determining the degree of barrier the sheet provides to contaminants, and the contaminants could include those that might be bacterial in nature. Further, the fibrous nonwoven sheet structure having an embossed impression pattern preferably has a Mullen burst strength above 500 kPa and measured Elmendorf tear performance above 2 N/m.

The fibrous nonwoven sheet structure includes nonwoven fabrics that can provide a stabilized surface with an embossed impression pattern for use in contact with the polymeric tie layer on the package. Such nonwoven sheet structures can include flash spun nonwoven sheet structures, spunbonded nonwovens, meltblown sheets, electro-blown sheets and any combination thereof. By fibrous, it is meant the material in the nonwoven sheet has some fibrous nature. This fibrous nature can be provided by such things as staple fibers, continuous or semi-continuous fibers, and/or plexifilamentary fibrous structures. The fibrous material can comprise a single material or a multitude of materials, either as a combination of different fibers or as a combination of similar fibers each comprised of different materials. The term "nonwoven" means the planar sheet structure comprises at least one web of randomly distributed fibrous material as opposed to woven or knitted fabrics, which are made by interwoven yarns or interlocked yarn loops. In some preferred embodiments the fibrous material in the nonwoven sheet is a synthetic polymer; in some embodiment the synthetic polymer is a thermoplastic polymer. In some preferred embodiments the fibrous material in the nonwoven sheet structure is free of added binder; that is, the fibrous material is bound in the sheet by melting of fibrous cross points in the sheet structure without additional binder compounds being added to the sheet.

In some embodiments the fibrous nonwoven sheet structure has a basis weight of less than 55 grams per square meter. In some more preferred embodiments the fibrous nonwoven sheet structure has a basis weight is less than 50 grams per square meter; and in some most preferred embodiments the fibrous nonwoven sheet structure has a basis weight of less than 45 grams per square meter.

The preferred fibrous material in the fibrous nonwoven sheet structure is plexifilamentary. The terms plexifilamentary and plexifilament as used herein refers to a three-dimensional integral network of a multitude of thin, ribbon-like, film-fibrils of random length and with a mean fibril thickness of less than about 4 micrometers and a median width of less than about 25 micrometers. In plexifilamentary structures, the film-fibrils are generally coextensively aligned with the longitudinal axis of the structure and they intermittently unite and separate at irregular intervals in various places throughout the length, width and thickness of the structure to form a continuous three-dimensional network. Such structures are described in further detail in U.S. Pat. Nos. 3,081,519 and 3,227,794.

The preferred method of making a fibrous nonwoven sheet structure having plexifilamentary fibrous material is by flash spinning. The resulting fibrous nonwoven sheet structure containing plexifilamentary film-fibril elements is also known as a flash spun plexifilamentary sheet.

As such, the preferred fibrous nonwoven sheets suitable for further bonding and embossing can be made using the general flash spinning technology as described in U.S. Pat. No. 3,227,794 to Anderson and U.S. Pat. No. 3,860,369 to Brethauer et al. Especially preferred fibrous nonwoven sheets suitable for further bonding and embossing can be made using a spin solution comprising high density polyethylene and a hydrocarbon spin agent as for example in U.S. Pat. Nos. 6,010,970; 7,338,916; 8,048,513; and 6,034,008. Preferably, the fibrous nonwoven sheets suitable for further bonding having improved permeability and barrier strength properties by flash spinning the sheet from a hydrocarbon-based spin solution comprising of between 12% and 20% by weight polyethylene and maintained at a temperature of above 180° C. prior to flashing; in some embodiments, the temperature is between 185° to 195° C. prior to flashing.

The fibrous material in the nonwoven sheet is preferably a polyolefin. Polyolefins can include polyethylene, polypropylene, polymethylpentene, polybutylene, and combinations thereof. Preferably the polyolefin is polyethylene. Polyethylene includes not only homopolymer of ethylene, but also copolymers wherein at least 85% of the recurring units arise from ethylene. A preferred polyethylene is linear high density polyethylene having an upper limit of melting range of about 130.0 to 137.0° C., a density in the range of 0.94 to 0.98 g/cm$^3$ and a melt index (as defined by ASTM D-1238-57T, Condition E) of between 0.1 to 100, preferably between 0.1 and 4. Polypropylene includes not only homopolymer of propylene but also copolymers wherein at least 85% of the recurring units arise from propylene units.

The package comprising a gas permeable fibrous nonwoven sheet structure, polymeric tie layer, and package substrate provides an enclosed interior environment capable of being sterilized. The enclosed environment is formed by sealing an area of contact between the first surface of the nonwoven, that is prebonded with an embossed impression pattern, and the package structure, with the polymeric tie layer.

In some embodiments, the package can be a type of pouch made from a film having a cavity for the material to be packaged, with the fibrous nonwoven sheet sealing the package. In this embodiment, it is preferred that the polymeric tie layer be integral to the film of the pouch, the tie layer being essentially the film exposed on the interior of the pouch such that comes in contact with the fibrous nonwoven sheet.

Alternatively, in some embodiments, the package can be a type of blister package, with the package substrate having thermoformed blister cavities for the material to be packaged and the fibrous nonwoven sheet structure providing the lidding for the package. Again, in a preferred embodiment, the polymeric tie layer is integral, being the inner surface of the thermoformed cavities and along with the lip of the package in contact with the fibrous nonwoven sheet sealing the cavities.

Plan views of two package substrates having cavities 16 and 18 are shown in FIGS. 3 and 4, respectively, the package substrates have sealing areas 15 and 17, respectively, that surround the cavities. When the cavities are sealed, the fibrous nonwoven sheet structure covers both the sealing areas and the cavities. The polymeric tie layer is disposed in the sealing area, positioned between the package substrate including the cavities and the fibrous nonwoven sheet material. The polymeric tie layer can be integral to the packaging substrate, which is preferred.

In some embodiments, the package is manufactured by forming the desired package substrate with the polymeric tie layer, filling the cavities with the material to be packaged, and then applying the nonwoven sheet structure pre-bonded with an embossed impression pattern, the embossed impression pattern being in contact with the polymeric tie layer, and then sealed. In some embodiments the nonwoven sheet structure can be a lidding component for a blister pack. The package is then sealed either by heat, pressure or a combination of both.

In some embodiments, the components are heat sealed, typically using a heated platen. While the cavity containing the item to be packaged is fully sealed, if desired some other areas on the package need not be fully sealed to provide a starting point for peeling off the fibrous nonwoven sheet structure prior to removing the product. If the fibrous nonwoven sheet structure is not pre-printed prior to sealing, the nonwoven sheet structure can be printed just before or after heat sealing.

While the preferred package embodiments are either pouches or blister-type packages it is understood any flexible of semi-rigid package, including such packages in the form of a sachet, a bag, or a sheath could use the fibrous nonwoven sheet structure prebonded with an embossed impression pattern as a gas-permeable feature.

The formed package has an enclosed interior environment for an item to be packaged, formed by sealing an area of contact between the first surface of a nonwoven sheet structure and the package substrate with the sealed area of contact being the polymeric tie layer, and the first surface of the nonwoven sheet structure being pre-bonded with an embossed impression pattern at least within the sealed area of contact. In some embodiments, the formed package has an enclosed interior environment including an item packaged by the enclosed environment, the enclosed environment formed by sealing an area of contact between the first surface of a nonwoven sheet structure and the package substrate with the sealed area of contact being the polymeric tie layer, and the first surface of the nonwoven sheet structure being pre-bonded with an embossed impression pattern at least within the sealed area of contact.

In some embodiments the formed package is a heat-sealed peelable package. As defined herein, the phrase "peelable package" means the sheet structure is sealed to the package with a "peelable seal". As defined herein, the phrase "peelable seal" means the sheet structure, having been sealed to the package, has an average peak load seal strength that is at least 0.5 pounds force per inch up to a maximum of 4 pounds force per inch or less. This means the sheet structure can be removed from the sealed package by hand, by exerting at least 0.5 pounds force per inch of seal and at most 4 pounds force per inch of seal. In some preferred embodiments the maximum average peak load seal strength is 3 pounds force per inch or less. In addition, the fibrous nonwoven sheet structure, because it has at least one surface being bonded with an embossed impression pattern, makes the surface bonded embossed impression pattern capable of making a "peelable seal" with the package.

One measure of seal integrity is characterized by the dye penetration test as described in ASTM F1929-12. Surprisingly, the packages made with a nonwoven sheet structure that is pre-bonded with an embossed impression pattern, and attached to the polymeric tie layer by the embossed surface in the seal area was found to have no negative impact on the dye penetration test.

The formed package has outstanding sealing and peeling properties. Surprisingly, the use of a fibrous nonwoven sheet structure having at least one surface being prebonded with an embossed impression pattern, in contact with a polymeric tie layer, can provide packages that have a clean peel and have very low fiber tear, or are actually fiber tear free. Surprisingly, when the surface of the nonwoven sheet with the embossing pattern is sealed to the film, the peel characteristics are improved.

The improved peel characteristics are shown by both a reduction in the percentage of packages that show fiber tear and/or a reduction in the severity of the fiber tear. Specifically, it has been found that when compared to non-embossed materials, the fibrous nonwoven sheet structure having at least one surface with an embossed impression pattern has a significant reduction in the packages that do not provide a clean peel. In particular it has been found that the use of an embossed sheet structure, when compared to a non-embossed structure, can provide at least a 25 percent reduction in packages with visual fiber tears, preferably at least a 30 percent reduction, or even higher.

In addition, it has been found that the seal strength, as measured by both average mean load and average peak load, is improved over the use of non-embossed fibrous nonwoven sheet structures. In other words, both the strength of the seal, and the quality of the peel are both improved by the use of an embossed surface on the face of the fibrous nonwoven sheet structure in contact with the polymeric tie layer.

Test Methods Basis weight. The basis weight is measured according to ASTM D3776 (2009).

Gurley Hill Porosity (or just "Gurley Porosity"; the phrases used interchangeably herein) is a measure of the permeability of the sheet material for gaseous materials. In particular, it is a measure of how long it takes a volume of gas to pass through an area of material wherein a certain pressure gradient exists. Gurley-Hill porosity is measured in accordance with TAPPI T-460 OM-88 using a Lorentzen & Wettre Model SE 166 or 516 from Lorentzen & Wettre, Kista, Sweden. This test measures the time required for 100 cubic centimeters of air to be pushed through a 28.7 mm diameter sample (having an area of one square inch) under a pressure of approximately 1.21 kPa (4.9 inches) of water. The result is expressed in seconds that are frequently referred to as Gurley Seconds. The reported value represents an average of at least 12 individual measurements.

Moisture vapor transmission rate. The Moisture vapor transmission rate (MVTR) is measured according to EN ISO 12572, Hygrothermal performance of building materials and products, Climate C, 2001. The measurement is performed using the multilayer method with a relative humidity of 100% in the cup, and air flow above the sample of 2.5 m/s and using a measurement interval of 30 minutes. The resulting MVTR is measured based on the weight loss of water in the sample The reported value represents and average of at least 1 measurement. Measurements are performed on a Gintronic Gravitest 6400 with an ES 420A balance from MRS Seitter, Lenning-Brück, Germany.

Particle penetration. Particle penetration is measured on the TSI 8130 equipment form TSI Incorporated, Shoreview, Minn., United States. The TSI 8310 is an equipment used for measurement according to NIOSH Procedures No. RCT-APR-STP-57, 58, 59. For the analysis the TSI 8130 equipment is used with a sodium chloride particle generation at a flow rate of 2.3 liter per minute. In order to achieve a flow rate of 2.3 liter per minute the control valve is closed and the air flow results from the air through the downstream photometer only. The sodium chloride particle distribution has a count median diameter of 0.075 μm, a mass mean diameter of 0.3 μm and a geometrical standard deviation of 1.8. Measurements are performed with a rise time of 25 seconds and a measurement time of 4 seconds. The penetration is measured based on the difference in light intensity by an upstream and downstream photometer. The reported penetration is an average of at least 6 measurements. The particle penetration can alternatively be expressed as the logartihmic reduction value based on the following formula:

LRV-TSI 8130=−log 10(penetration [%]/100)

Elmendorf tear. Elmendorf tear is measured according to ISO 1974: 1990; Paper—Determination of tearing resistance (Elmendorf method). The Elmendorf is measured on the 09 ED Tear Tester from Lorentzen & Wettre, Kista, Sweden. The Elmendorf tear is measured in both the machine direction (MD) and cross direction (XD).

Mullenburst strength. Mullenburst strength is measured according to ISO 2758:2001. Paper—Determination of bursting strength. The Mullenburst is measured using Lorenzen & Wettre Model 519L from Lorentzen & Wettre, Kista, Sweden that is integrated into a Autoline 400 from Lorentzen & Wettre, Kista, Sweden.

Figure 5:
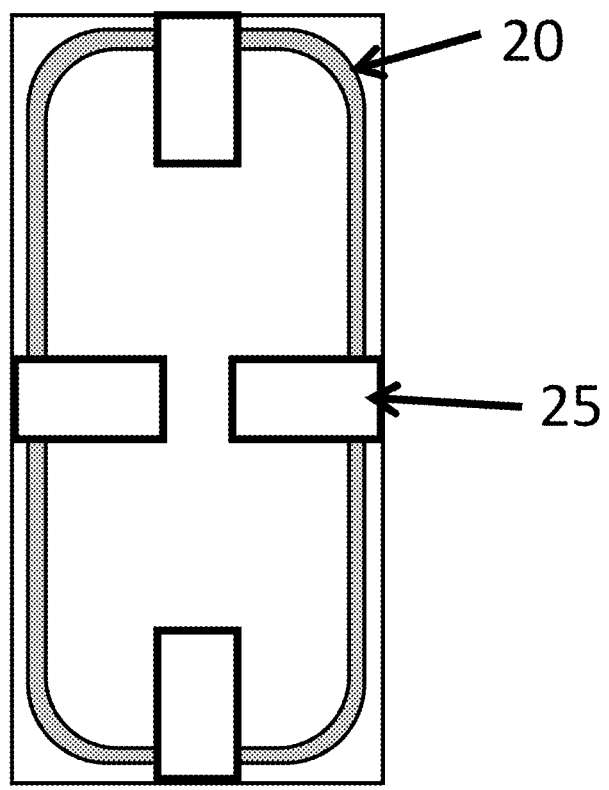
FIG. 5 is an Illustration of the location of the 4 samples for the determination of the seal strength of a package.

Seal strength. Seal strength is measured according to ASTM F88/F88M Appendix C, with the "free tail" mode. As shown on FIG. 5, 4 stripes per test package 25 are cut at defined location with a width of 1 inch to test the seal 20. The edges of the stripes are clean-cut and perpendicular to the direction of the seal. The most rigid part of the seal was placed on the upper clamp. The nonwoven sheet produced is the most rigid part of the seal and therefore placed on the upper clamp. The seals were tested at a grip separation rate of 300 mm/min. The number of number of measurements per test item is at least equal to 24. The seal strength is reported both as the average of the mean load seal strength and as the average of the peak load seal strength in pound force per inch, lbf/in.

Dye penetration. Dye Penetration is performed according to ASTM F1929-12 "Standard Test method for Detecting Seal Leaks in Porous Mecial packaging by Dye Penetration". ASTM F1929-12 defines a procedure that will detect and locate a leak equal to or greater than a channel formed by a 50 μm (0.002 in.) wire in package edge seals formed between a transparent material and a porous sheet material. A dye penetrant solution is applied locally to the seal edge to be tested for leaks. After contact with the dye penetrant for a specified time of 5 seconds, the package is visually inspected for dye penetration. Provided no channel is visually seen the dye penetration test for the package is "passed".

Printing. The nonwoven sheet is printed with a linear barcode or a 2D datamatrix. Testing of linear barcodes is performed according to ISO 15416, and testing of 2 dimensional datamatrix as described in ISO 15415.

Fiber tear. Fiber tear is performed by a visual inspection of packages being opened. The packages were opened manually in the following manner. The nonwoven sheet is hold in one hand and the film is hold in the other hand. The time for opening one package is about one second. The packages are not opened till it reaches the lower edge seal. In other words, the package is not opened completely, but only on the top seal and the two seals on the side. After each package is opened, the surface of the nonwoven sheet that was sealed to the film is inspected. The surface should be homogeneous and continuous without the presence for peel off and tearing of the nonwoven sheet. A package has fiber tear provided there is peel off or tear of the nonwoven sheet. The above procedure is performed for at least 50 packages. The percentage of package showing fiber tear is determined from the number of packages that show fiber tear divided by the total number of packages opened. Alternatively, fiber tear can be performed according to EN 868-5 (2009), Appendix E. However, this standard does not count some smaller length visual fibers. As shown in the examples and defined herein, a "package showing fiber tear" is one that after opening has attached fibers of any length that can been seen with the un-aided eye.

Examples 1 & 2

Unfinished fibrous nonwoven sheets for further bonding and embossing were made from a spin solution comprising high density polyethylene and n-pentane hydrocarbon spin agent, using the general flash spinning process as described in Examples 9-15 of U.S. Pat. No. 6,034,008 to Lim et al, with the exception being the polymer concentration in the spin solution was 17 percent by weight and the spin temperature was 195° C. The polyethylene had a melt flow index (as measured by ASTM D1238-13) at 2.16 kg/190° C. of about 0.75 g/10 min. Two different basis weight nonwoven sheets were made.

The unfinished fibrous nonwoven sheet was then bonded with an embossed impression pattern by a modification to the process described in U.S. Pat. No. 5,972,147 to Janis, particularly the equipment shown in FIG. 2 of that patent. In the process shown in the figure, the sheet alternately wraps and is preheated by a single set of two preheating rolls which are followed by bonding of the sheet in the nips of two sets of two calender rolls wherein the first set of rolls bonds one side of the sheet and the second set of rolls bonds the other side of the sheet; followed by cooling the sheet with a single set of two cooling rolls.

In particular, the process of Janis was modified such that an additional set of preheating rolls was used, such the sheet alternately wrapped four preheating rolls (versus 2) without any nip between the rolls. Further, only the second set of calender rolls nipped the sheet, operating at a nip pressure of about 200 pounds per linear inch. The first set of calender rolls were left open and did not nip the sheet. This was followed by cooling the sheet with a two sets of two cooling rolls (versus a single set of two).

The particular equipment arrangement involved the bottom of the sheet wrapping the first preheat roll (PH1), with the top of the sheet wrapping the second preheat roll (PH2), followed by the bottom of the sheet wrapping the third preheat roll (PH3), and then the top of the sheet wrapping the second preheat roll (PH4). Because the first set of calender rolls does not nip the sheet, the top surface of the sheet was not embossed. The second set of calender rolls bonded the bottom surface of the sheet and embossed a linen impression pattern, such as shown in FIG. 1, in the surface of the sheet.

The sheet was subsequently transferred to the cooling section and then wound up into a roll. The temperature of the pre-heat rolls and embosser are shown in Table 1 and the resulting sheet properties are summarized in Table 2.

TABLE 1

| Example | 1 | 2 |
|---|---|---|
| Temperature PH 1 (° F.) | 295 | 295 |
| Temperature PH 2 (° F.) | 275 | 275 |
| Temperature PH 3 (° F.) | 275 | 275 |
| Temperature PH 4 (° F.) | 290 | 290 |
| Embosser 2 temperature (° F.) | 290 | 290 |

TABLE 2

| Example | 1 | 2 |
|---|---|---|
| Basis weight (g/m$^2$) | 44 | 47 |
| Gurley Air Porosity (s) | 5.5 | 7.4 |
| MVTR (g/m$^2$/24 hr) | 7961 | 9004 |
| Elmendorf Tear MD (N/m) | 2.8 | 3.0 |
| Elmendorf Tear XD (N/m) | 3.9 | 4.5 |
| Elmendorf Tear Avg (N/m) | 3.4 | 3.8 |
| Mullenburst strength (kPa) | 571 | 766 |
| Penetration - TSI 8130 (%) | 4.25 | 2.23 |
| LRV - TSI 8130 | 1.37 | 1.65 |

Comparison Example A

An unfinished fibrous nonwoven sheet for further bonding and embossing was made from a spin solution comprising high density polyethylene and n-pentane hydrocarbon spin agent, using the general flash spinning process as described Examples 9-15 of U.S. Pat. No. 6,034,008 to Lim et al, with the exception being the polymer concentration in the spin solution was 17 percent by weight and the spin temperature was 185° C. The polyethylene had a melt flow index (as measured by ASTM D1238-13) at 2.16 kg/190° C. of about 0.7 g/10 min.

The unfinished fibrous nonwoven sheet was then bonded by the process generally as described in U.S. Pat. No. 3,532,589 to David using a steam pressure of 66.7 psia. This is the process described in U.S. Pat. No. 6,034,008 to Lim et al. for generating "hard structure" nonwoven sheets. In this process the nonwoven sheet passes subsequently over a heated drum, followed by a cooling drum, then another heating drum and cooling drum to thermally bond both sides of the material. The heating drum is kept at a temperature that would result in partial melting of the nonwoven to induce the bonding of the sheet. The resulting sheet properties are summarized in Table 3.

TABLE 3

| Example | A |
|---|---|
| Basis weight (g/m$^2$) | 44 |
| Gurley Air Porosity (s) | 7 |
| MVTR (g/m$^2$/24 hr) | 8500 |
| Elmendorf Tear MD (N/m) | 4.3 |
| Elmendorf Tear XD (N/m) | 4.5 |
| Elmendorf Tear Avg (N/m) | 4.4 |
| Mullenburst strength (kPa) | 679 |
| Penetration - TSI 8130 (%) | 5.0 |
| LRV - TSI 8130 | 1.3 |

Example 3

The resulting nonwoven sheets from Example 1 and Comparison Example A, each of which had a basis weight of 44 grams/meter$^2$ were then is used to create medical packages using Multivac R535 equipment. The Multivac R535 equipment makes 4 packages in one substrate, each package having a length of 200 mm in machine direction, about 95 mm in cross direction, and about 7.5 mm seal width as shown as dimension 5 in FIG. 3. The nonwoven sheet was attached to the package substrate in the sealing area of contact using 2 different tie film materials. Film 1 was Multifol GA Tyvek®, a 100 µm polyimide/polyethylene peelable film from SUdpack Verpackungen GmbH & Co. KG, Ochsenhausen, Germany. Film 2 was Wipak® ML E 135 TF PEEL is a polyethylene/polyamide/polyethylene film from Wipak, Nastola, Finland.

In all cases the nonwoven surface from the nonwoven sheet of Example 1 that was bonded and embossed with the linen pattern was sealed to the film. All packages were made with a seal pressure of 6.5 bar and a dwell time of 1.2 seconds. The sealing temperature was set to at least two levels for each film—resulting in a different seal strength. The packages were then opened by peeling the nonwoven off the tie film.

The seal temperature and resulting seal strength values are given in the Table 4. With increasing seal temperature, the average peak seal strength and average mean seal strength increased for the individual films. Also, at a higher seal strength, the percentage of packages showing fiber tear increases. However, in every instance, the nonwoven sheet having the embossed pattern had both improved fiber tear (peel) and sealing performance, with the percent reduction in fiber tear ranging from 32% to 73%.

TABLE 4

| Item | Film | Seal Temp (° C.) | Seal Strength Avg. Peak Load (lbf/in) | Seal Strength Avg. Mean Load (lbf/in) | Packages Showing Fiber Tear (%) | Reduction in Fiber Tear (%) |
|---|---|---|---|---|---|---|
| 1-1 | 1 | 105 | 1.40 | 0.98 | 37 | 34 |
| A-1 | 1 | 105 | 0.41 | 0.39 | 56 | — |
| 1-2 | 1 | 115 | 1.41 | 1.34 | 35 | 65 |
| A-2 | 1 | 115 | 0.92 | 0.91 | 99 | — |
| 1-3 | 2 | 108 | 0.78 | 0.72 | 17 | 73 |
| A-3 | 2 | 108 | 0.60 | 0.57 | 62 | — |
| 1-4 | 2 | 118 | 1.32 | 1.23 | 64 | 32 |
| A-4 | 2 | 118 | 1.15 | 1.09 | 94 | — |

Example 4 and Comparison Example B

Example 2 was repeated using a nonwoven sheet having a basis weight of 47 g/m$^2$ with the same embossed linen pattern; however, the unfinished sheet was bonded using the embossing conditions shown in Table 5. The resulting bonded nonwoven sheet had a Gurley Porosity of 3.6 seconds.

For Comparison Example B, the process was repeated with the same basis weight sheet and temperature conditions as shown in Table 5 but without embossing the bottom of the sheet. (The sheet was not nipped in the calender rolls.) The resulting nonwoven sheet was bonded without any embossing and had a Gurley Porosity of 2 seconds.

TABLE 5

| Example | 3 | B |
| --- | --- | --- |
| Temperature PH 1 (° F.) | 240 | 240 |
| Temperature PH 2 (° F.) | 272 | 272 |
| Temperature PH 3 (° F.) | 280 | 280 |
| Temperature PH 4 (° F.) | 286 | 286 |
| Embosser 2 temperature (° F.) | 296 | — |

The resulting nonwoven sheet with a surface that was bonded and embossed with the linen pattern, and the bonded nonwoven sheet without any embossing was then used to create medical packages using a Autovak M320 machine, Hongkong, China. The Autovak machine produced two packages at the same time of about 190 mm length in machine direction and 127 mm in cross direction, and a 10 mm seal width as shown by the dimension 10 in FIG. 4. The nonwoven sheet was attached to the package substrate in the sealing area of contact using a 135 μm thick polyimide/polyethylene peelable tie film with code UGBLGV340C from Xiangfu(zhongshan) Film Packaging Co., LTD, 180, Zhongshan 5th Rd, Guandong, China. The film is pre-heated in the forming zone. The temperature in the forming zone is 105° C. and the residence time is set equal to 1.0 second. The seal temperature for all packages is set equal to 120° C. The dwell time is adapted to change the resulting seal strength of the package. The seal time and seal strength are shown in Table 6. The packages were then opened by peeling the nonwoven off the tie film. As shown in Table 6, the packages that utilized the nonwoven sheet that was only bonded but not embossed had higher seal strength properties but showed totally unacceptable fiber tear performance, while the packages utilizing the embossed nonwoven had acceptable seal strength properties and superior fiber tear (peel) performance.

TABLE 6

| Item | Sealing Time (sec) | Seal Strength Avg. Peak Load (lbf/in) | Seal Strength Avg. Mean Load (lbf/in) | Packages Showing Fiber Tear (%) |
| --- | --- | --- | --- | --- |
| 4-1 | 1.2 | 1.43 | 1.25 | 8 |
| 4-2 | 1.5 | 1.53 | 1.38 | 2 |
| 4-3 | 1.8 | 1.67 | 1.52 | 0 |
| B-1 | 1.2 | 1.42 | 1.21 | 100 |
| B-2 | 1.5 | 1.57 | 1.37 | 100 |
| B-3 | 1.8 | 1.77 | 1.64 | 100 |

Examples 5, 6, & 7

These examples illustrate the embossing can be applied to the nonwoven sheet as a separate step after bonding the nonwoven sheet. Comparison Example B was repeated, wherein the nonwoven sheet was bonded but not embossed, using two different nonwoven sheet basis weights. The bonded sheets were wound up on rolls. The rolls of bonded nonwoven sheet were then subsequently unwound and embossed on one surface by nipping the sheet with a set of heated calender rolls, this time providing one surface of the sheet with an embossed pattern that was the dogbone pattern as shown in FIG. 2 rather than the linen pattern. The conditions for bonding and subsequent embossing are shown in Table 7. As in Example 4, packages were made with the same tie film with the embossed surface in contact with the tie film. The results shown in Table 8.

TABLE 7

| Example | 5 | 6 | 7 |
| --- | --- | --- | --- |
| Basis Weight (g/m$^2$) | 41 | 47 | 47 |
| Temperature PH 1 (° F.) | 240 | 240 | 240 |
| Temperature PH 2 (° F.) | 272 | 272 | 272 |
| Temperature PH 3 (° F.) | 280 | 280 | 280 |
| Temperature PH 4 (° F.) | 286 | 286 | 286 |
| Embosser temperature (° F.) | 296 | 292 | 296 |
| Gurley Air Porosity | 2.6 | 4.8 | 3.2 |
| Penetration - TSI 8130 (%) | 5.2 | * | 6.6 |
| LRV - TSI 8130 | 1.3 | * | 1.2 |

(* not measured)

TABLE 8

| Item | Sealing Time (sec) | Seal Strength Avg. Peak Load (lbs/in) | Seal Strength Avg. Mean Load (lbs/in) | Packages Showing Fiber Tear (%) | Dye Penetration |
| --- | --- | --- | --- | --- | --- |
| 5-1 | 1.2 | 1.43 | 1.23 | 2 | Passed |
| 5-2 | 1.5 | 1.50 | 1.33 | 16 | Passed |
| 5-3 | 1.8 | 1.65 | 1.48 | 24 | Passed |
| 6-1 | 1.2 | 1.20 | 1.06 | 20 | Passed |
| 6-2 | 1.5 | 1.30 | 1.20 | 10 | Passed |
| 6-3 | 1.8 | 1.44 | 1.31 | 12 | Passed |
| 7-1 | 1.2 | 1.16 | 1.04 | 0 | Passed |
| 7-2 | 1.5 | 1.41 | 1.29 | 10 | Passed |
| 7-3 | 1.8 | 1.54 | 1.40 | 22 | Passed |

The packages were then opened by peeling the nonwoven off the tie film. As shown in Table 8, the packages that utilized the embossed nonwoven had superior peel performance.

Example 8

The nonwoven sheet structures having an embossed impression pattern that were used in Examples 1 to 7 were tested for barrier and mechanical properties. All of these inventive sheet structures had an Elmendorf tear above 2.0N, a Mullenburst strength above 500 kPa. All of the inventive sheet structures had a particle barrier penetration of below 10%, using the TSI 8130 equipment operated with a flow rate of 2.3 L/min. The un-embossed side of each of the nonwoven structures accepts printing in the form of a linear barcode and a 2D datamatrix with good visual result.

What is claimed is:
1. A package for providing an enclosed interior environment capable of being sterilized, the package consisting of a gas permeable fibrous nonwoven sheet consisting of polyethylene plexifilaments, polymeric tie layer, and package substrate, the nonwoven sheet having a first surface and a second surface;

the enclosed interior environment being formed by sealing an area of contact between the first surface of the nonwoven sheet and the package substrate, the sealed area of contact being formed by the polymeric tie layer, wherein the first surface of the nonwoven sheet is pre-bonded with an embossed impression pattern at least within the sealed area of contact, and wherein the second surface of the nonwoven sheet is free of any embossed pattern, and wherein the sealed area of contact being formed by the polymeric tie layer and the first surface pre-bonded with an embossed impression pattern passes the dye penetration test per ASTM F1929-12, and wherein the first surface pre-bonded with an embossed impression pattern, when compared to a non-embossed surface, provides a reduction in visible fiber tears of at least 25 percent after the sealed area of contact is opened by peeling the sheet from the polymeric tie layer.

2. The package of claim 1 wherein the polymeric tie layer is integral with the package substrate.

3. The package of claim 1 wherein the polymeric tie layer and package substrate are combined in a film.

4. A fibrous nonwoven sheet suitable for use in a sterile package made by sealing the nonwoven sheet to a package substrate via a polymer tie layer, wherein the sterile package is later opened by peeling the sheet from the polymeric tie layer, the sheet being gas permeable and having a first surface and a second surface and consisting of polyethylene plexifilaments;

the first surface being bonded with an embossed impression pattern and the second surface being capable of accepting printing, wherein the second surface of the nonwoven sheet is free of any embossed pattern;

the sheet having a particle barrier penetration of below 10%, a Gurley Hill Porosity of 40 seconds or less, and a moisture vapor transport rate of 3500 $g/m^2/day$ or greater, wherein when a sealed area of contact is formed between the first surface pre-bonded with an embossed impression pattern and the polymeric tie layer of the package substrate, the sealed area of contact passes the dye penetration test per ASTM F1929-12, and wherein the first surface pre-bonded with an embossed impression pattern, when compared to a non-embossed surface, provides a reduction in visible fiber tears of at least 25 percent after the sealed area of contact is opened by peeling the sheet from the polymeric tie layer.

5. The fibrous nonwoven sheet of claim 4 having a Gurley Hill Porosity of 10 seconds or less.

6. The fibrous nonwoven sheet of claim 4 having a moisture vapor transport rate of 7500 $g/m^2/day$ or greater.

7. The fibrous nonwoven sheet of claim 6 having a moisture vapor transport rate of 9000 $g/m^2/day$ or greater.

8. The package of claim 1 wherein the fibrous nonwoven sheet having at least one surface prebonded with an embossed impression pattern, when compared to a non-embossed structure, provides an improved seal strength as measured by both average mean load and average peak load.

9. The fibrous nonwoven sheet of claim 4 wherein the at least one surface prebonded with an embossed impression pattern, when compared to a non-embossed structure, provides an improved seal strength as measured by both average mean load and average peak load.

* * * * *